United States Patent [19]

Dorschner et al.

[11] 3,881,908

[45] May 6, 1975

[54] HERBICIDAL N-HALOACYL (2-SPIROCYCLOALIPHATIC) OXAZOLIDINES

[75] Inventors: Kenneth P. Dorschner, Jacksonville, Fla.; James A. Albright, St. Louis, Mich.

[73] Assignee: SCM Corporation, Cleveland, Ohio

[22] Filed: July 27, 1973

[21] Appl. No.: 383,348

Related U.S. Application Data

[62] Division of Ser. No. 280,836, Aug. 15, 1972.

[52] U.S. Cl............ 71/88; 260/307 F; 260/247.2 R; 260/293.67; 71/94; 71/95
[51] Int. Cl............................................... A01n 9/22
[58] Field of Search........................... 71/88, 94, 95

[56] References Cited

UNITED STATES PATENTS

| 3,221,021 | 11/1965 | Hickner | 71/88 |
| 3,707,541 | 12/1972 | Lajiness | 260/244 R |

*Primary Examiner*—Lewis Gotts
*Assistant Examiner*—Catherine L. Mills
*Attorney, Agent, or Firm*—A. Joseph Gibbons; Merton H. Douthitt

[57] ABSTRACT

N-haloacyl (2-spirocyclopentyl, 2-spirocyclohexyl and 2-spirocycloheptyl) oxazolidines including those substituted at the 4 and 5 positions with lower alkyl groups are selective herbicides for the protection of crop plants including corn, cotton and peanuts.

12 Claims, No Drawings

HERBICIDAL N-HALOACYL (2-SPIROCYCLOALIPHATIC) OXAZOLIDINES

This is a division of application Ser. No. 280,836 filed Aug. 15, 1972.

BACKGROUND OF THE INVENTION

This invention relates to substituted oxazolidines and more particularly to N-haloacyl (spirocycloaliphatic) oxazolidines, herbicidal compositions containing same, and a process for controlling plant growth with same. The closest art known to applicants is listed in attached form PO-1082.

The oxazolidine ring is a 5-member carbocyclic ring having an oxygen atom at the one position and a nitrogen atom at the three position, thus:

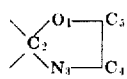

Various derivatives have been suggested for use as herbicides, insecticides, microbiocides, microbiostats, and pharmaceuticals.

SUMMARY OF THE INVENTION

One aspect of this invention is an N-haloacyl (2-spirocycloaliphatic) oxazolidine wherein the haloacyl group is $C_{2-4}$ acyl and the 4 and 5 carbon atoms of the oxazolidine ring are satisfied by hydrogen atoms or $C_{1-6}$ alkyl groups.

Another aspect of this invention is a herbicidal composition comprising about 1–98% of such oxazolidine and an agriculturally acceptable carrier therefor.

Still another aspect of this invention is a process for controlling growth of vegetation which comprises applying to the locus of such vegetation such oxazolidine at the rate of about 0.5 – 15 pounds per acre.

The subject compounds can be depicted structurally as follows:

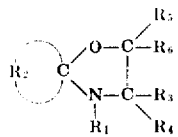

Where $R_1$ is a $C_{2-4}$ haloacyl group, e.g., chloracetyl; $R_2$ is a divalent hydrocarbyl radical which forms with the 2 carbon atom of the oxazolidine ring a cycloaliphatic group, e.g., a cyclohexyl group; $R_3$, $R_4$, $R_5$, and $R_6$ are hydrogen atoms or lower $C_{1-6}$ alkyl groups.

The haloacyl group on the oxazolidine nitrogen atom is of special importance for achieving herbicidal effectiveness. This is demonstrated particularly by Example 20 wherein a similar compound with simply a corresponding unhalogenated acyl group was tested as a control and found to be quite ineffective in contrast to the claimed types. For efficiency and economy the advantageous haloacyl groups are chlorinated, preferably monochlorinated, but multiple halogenation can be practiced, and the halogen also can be bromine, iodine and/or fluorine. Additionally, such haloacyl group advantageously is haloacetyl for efficiency and economy, but halopropionyl and halobutyryl radicals (normal and isomeric) also can be used.

In general, for efficiency and economy of preparation and general herbicidal use the spirocycloaliphatic group of the subject oxazolidines advantageously is a $C_{5-8}$ nucleus (ring), particularly an hydrocarbyl nucleus that is unsubstituted or substituted only by lower (i.e., $C_{1-6}$ and preferably $C_{1-3}$) alkyl groups, and especially the saturated of such nuclei. It is, of course, within the skill of the art to replace hydrogen atoms in such nucleii by halogen, carbonitrile, nitro, alkoxy, mercapto, amido, ester, thioester, and/or hydroxy groups.

It is also possible that the divalent hydrocarbyl radical $R_2$ can contain atoms other than carbon and thus form with the carbon at the 2-position of the oxazolidine heterocyclicspiro rings, such as, for example, piperidinespiro, morpholinespiro and pyrrolidinespiro.

In general, we have found that the oxazolidines alkylated at the 4 or 5 carbon atom of the oxazolidine ring are excellent herbicides. Usually, the compounds dialkylated at the 4 position with lower alkyl groups, such as methyl, ethyl and propyl groups, are particularly effective and selective. Surprising herbicidal protection is afforded when the oxazolidine is alkylated in the 4 and the 4 and 5 positions. In these cases, plant crops such as corn, soybean and cotton are protected from various noxious weed species.

Also surprisingly, while many of the subject compounds are useful for post-emergent selective herbicides, some, as will be shown, can be applied pre-emergently to the plant locus, and some even soil-incorporated with effectiveness for weed control.

Application dosages of these herbicides, based on the active ingredient, suitably can be fairly high, but for economy generally are about 15 pounds per acre or below, advantageously not more than about 8 pounds per acre, and generally 0.5 – 8 pounds per acre, although dosages an high 40 pounds per acre can be used.

By crop plants is meant not only agricultural crops which are used for food supply of man and animals, but also includes other desirable plants such as forage grass and lawn species where broad leaf and other undesirable weeds are to be controlled, suppressed, or eradicated.

In general, oxazolidines of this invention are effective in the elimination or control of weeds including coffeeweed (Sesbania, spp.), pigweed (Amaranthus, spp.), crabgrass (Digitaria, spp), barnyard grass (Echinochloa, spp.), without significant injury to specific crops such as corn, cotton, peanuts, soybeans, and cucurbits.

Conventional formulations can be used to apply these herbicides using the agriculturally acceptable carriers inert towards the subject oxazolidine, not harmful to the operator, the plant, or the environment of the plant. Hence, intermediates, unreacted excess reactants or reagents, by-products of reaction, and solvents containing such extraneous chemical material definitely are not a part of the inventive compositions, the latter whose active ingredients should be fairly commercially pure compounds of a good technical grade, e.g., 85% purity or higher, with only innocuous diluents admixed with them.

Applications as wettable powders dispersed in an aqueous medium are preferred when the oxazolidine is relatively insoluble in the application solvent. Wettable powders can be formulated from inert carriers such as clays, talc, diatomaceous earth and other siliceous inorganic solids and silicates. Although the wettable powder can contain any proportion of active herbicides from about 1 to 98 percent, it is generally more economically feasible to use a high loading of active selective herbicide material. Active ingredient concentrations of 50–90 percent based on weight of inert carrier is recommended, and concentrations roughly of 80 weight percent active ingredient are preferred. It is desirable that both the inert carrier and herbicide, if solids, be ball-milled or ground by other common techniques to a very fine state of subdivision so that they will pass through a 325-mesh screen (U.S. Standard Sieve).

The formulation can contain various other agents to wet, disperse, and emulsify the herbicidal composition whether or not a solvent is used in the application to the locus of the plant or to the soil. The surfactants or other detergents employed can be anionic, nonionic, or cationic as are detailed in McCutcheon's 1969 publication on *Detergents and Emulsifiers*. Surfactants useful in formulation of our selective herbicides, are usually added in amounts of 1 to 10 percent based on the total weight of waterwettable powder formulation, but generally in the order of 2 percent. These can be alkyl and alkylaryl polyether alcohols, polyoxyethylene sorbitols, or sorbitan fatty acid esters, alkylaryl sulfonates, long chain quaternary ammonium chlorides, and the like.

Water emulsions may be prepared with the aid of emulsifiers such as triethanolamine stearate, sodium lauryl sulfonate, sodium alkyl naphthalene sulfonate, sodium oleate, p-t-octylphenoxypolyethoxy ethanol, as well as other well-known emulsifiers.

For certain pre-emergence or soil-incorporated applications the active oxazolidine is best applied in a powder or granular form using inert clays or talcs and the like as the carrier. These granular formulations tend to prolong the activity of the herbicide by controlling its release into the soil.

The characteristic of a good selective herbicide is that when it is applied near or on the foliage of the crop plant, only the weed species is killed while the valuable crop plants are not harmed beyond the point of recovery, thus allowing a high percentage (85–100 percent) to mature to harvestable crops.

We have found the following compounds representative of the types most efficacious as selective herbicides:

3-(α-chloroacetyl)-2-cyclohexanespiro-4,4-dimethyloxazolidine 3-(α-chloroacetyl)-2-cyclohexanespiro-5-methyloxazolidine 3-(α-chloroacetyl)-2-cyclopentanespiro-4,4-dimethyloxazolidine 3-(α-chloroacetyl)-2-cycloheptanespiro-4,4-dimethyloxazolidine 3-(α-chloroacetyl)-2-cyclohexanespiro-4-methyloxazolidine 3-(α-chloroacetyl)-2-(2'-methylcyclohexane)spiro-4,4-dimethyl-oxazolidine 3-(α-chloroacetyl)-2-(3',5',5'-trimethyl-2'-cyclohexene)spiro-4,4-dimethyl-oxazolidine 3-(α-chloroacetyl)-2-cyclohexanespiro-4-ethyloxazolidine 3-(α-chloracetyl)-2-cyclohexanespiro-5-methyloxazolidine 3-(α-chloroacetyl)-2-(3',4'-dimethylcyclohexane)spiro-4,4-dimethyl-oxazolidine 3-(α-chloroacetyl)-2-(1'-carbethoxypiperidine-4'spiro)-4,4-dimethyl-oxazolidine 3-(α-chloroacetyl)-2-cycloheptanespiro-5-methyloxazolidine 3-(α-chloroacetyl)-2-(2'-methylcyclopentane)spiro-5-methyl-oxazolidine 3-(α-chloroacetyl)-2-(3',3',5',5'-tetramethylcyclohexane)spiro-4,4-dimethyl-oxazolidine 3-(α-chloroacetyl)-2-(3',3',5',5'-tetramethylcyclohexane)spiro-5-methyl-oxazolidine 3-(α-chloroacetyl)-2-(3',5'-dimethylcyclohexane)-spiro-4,4-dimethyl-oxazolidine 3-(α-chloroacetyl)-2-(4'-methylcyclohexane)spiro-4,4-dimethyl-oxazolidine

SYNTHESIS

The unacylated oxazolidine intermediates for preparing the subject compounds can be synthesized conveniently by reacting substituted amino alkanols with ketones. A substantial list of these compounds is given in the review article "THE OXAZOLIDINES", E. D. Bergman, *Chem. Rev.*, 53; 309 (1953). Usually, the amino alcohol and the ketone are heated together in an inert hydrocarbon solvent, and by-product water is separated from the condensed azeotropic mixture of hydrocarbon and water in a Dean-Stark water separator. The solvent is then evaporated and the product purified by distillation under reduced pressure. Suitable reaction solvents are water immiscible hydrocarbons such as benzene, toluene and the like. A preferred solvent is benzene because of its low boiling point.

N-haloacyl oxazolidines of this invention can be synthesized by reacting the corresponding intermediate oxazolidine with the desired haloalkylcarbonyl chloride (also described as a haloacyl chloride) at a temperature in the range of about 50°C. in the presence of an acid-acceptor. The reaction is preferably carried out in an organic solvent, inert under the conditions of the reaction. For example, acetonitrile, benzene, xylene and the like; hydrocarbon solvents are generally preferred. The acid-acceptor is generally a basic substance which forms water soluble by-products easily separable from the main reaction product. Although the acid-acceptor can sometimes be an alkali metal salt of a weak acid, such a sodium or potassium carbonate, or acetate, it is preferable to use a tertiary amine. Useful and common tertiary amines are, for example, triethylamine and pyridine; frequently the crystalline hydrohalide formed as a by-product is insoluble in the reaction solvent and easily removed by filtration. When a hydrocarbon solvent is used the product is frequently completely soluble in the reaction solvent and workup is conveniently carried out by filtering the by-product amine hydrohalide, washing the remaining organic phase with water, and removing the reaction solvent by evaporation or distillation. Thereafter, the product can usually be purified by conventional distillation procedures including ones at subatomspheric pressure.

The following examples are intended to illustrate the invention but not to limit the scope thereof, parts and percentage being by weight unless otherwise indicated:

EXAMPLE 1

3-(α-chloroacetyl)-2-cyclohexanespiro oxazolidine

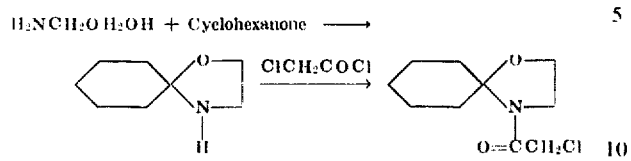

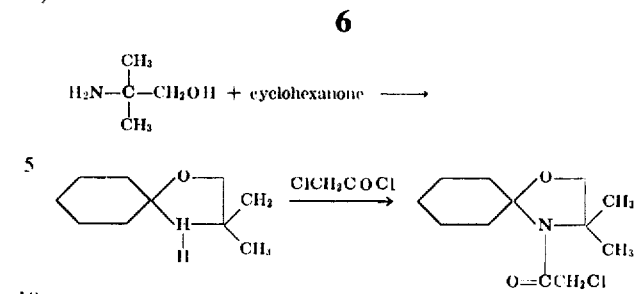

Cyclohexanone (32 g.) was added to ethanolamine (15 g.) dissolved in 50 ml. of benzene and the mixture was stirred and refluxed collecting the water from the condensed azeotropic distillate using a Dean-Stark water separator. After the theoretical amount of water had been collected, the benzene was evaporated and the residue was distilled to give 24 g. of 2-cyclohexanespirooxazolidine, a liquid boiling at 55°–57° C. at 0.25 mm Hg absolute.

To a magnetically stirred solution of 2-cyclohexanespirooxazolidine (14 g.) in 100 ml. benzene was added triethylamine (10 g.) and then a solution of 11 grams of chloroacetylchloride dissolved in 100 ml. benzene was added dropwise over a period of 1 hour. An exothermic reaction developed and the stirring was continued overnight. The precipitated triethlamine hydrochloride was filtered and the benzene filtrate evaporated leaving an orangecolored solid. After recrystallization from ethanol, 7 g. of the product was obtained as a pale yellow solid, m.p. 112°–115° C.

EXAMPLE 2

3-(α-chloroacetyl)-2-cyclohexanespiro-4,4-dimethyloxazolidine

A benzene solution containing 22 g. of 2-amino-2-methyl-1-propanol and 32 g. of cyclohexanone was magnetically stirred and refluxed using a Dean-Stark water separator until the theoretical amount of water separated. The solution was concentrated and the resulting oil distilled to yield 34 g., 2-cyclohexanespiro-4,4-dimethyl-oxazolidine, a colorless liquid, b.p. 50°–52° at 0.25 mm Hg absolute.

A benzene solution of 8 g. of the intermediate oxazolidine and 5 g. of triethylamine was magnetically stirred at room temperature. Chloroacetyl chloride (5 g.) dissolved in 50 ml of benzene was added dropwise, and, upon complete addition, the mixture was stirred for 2 hours. The solid triethylamine hydrochloride was filtered off and discarded. The benzene solution was concentrated and the thick brown residue was recrystallized from light petroleum either to give the product as a tan solid, m.p. 55°–58° C.

In a manner similar to that of Example 1 and 2, the following compounds were synthesized using the indicated aldehyde or ketone and the indicated amine in place of the cyclohexanone and 2-amino-ethanol used in Example 1.

| EXAMPLE NO. | OXAZOLIDINE PRODUCT | STARTING AMINO ALCOHOL | STARTING ALDEHYDE OR KETONE |
|---|---|---|---|
| 3 | 3-(α-chloroacetyl)-2-cyclopentanespiro-5-methyl-oxazolidine | B | cyclopentanone |
| 4 | 3-(α-chloroacetyl)-2-cyclopentanespiro-4-4-dimethyl-oxazolidine | A | cyclopentanone |
| 5 | 3-(α-chloroacetyl)-2-cycloheptanespiro-4-4-dimethyl-oxazolidine | A | cycloheptanone |
| 6 | 3-(α-chloroacetyl)-2-cyclohexanespiro-4-methyl-oxazolidine | C | cyclohexanone |
| 7 | 3-(α-chloroacetyl)-2-(2'-methylcyclohexane)spiro-4,4-dimethyl-oxazolidine | A | 2-methylcyclohexanone |
| 8 | 3-(α-chloroacetyl)-2-cyclohexanespiro-4-ethyl-oxazolidine | D | cyclohexanone |
| 9 | 3-(α-chloroacetyl)-2-(2'-methylcyclohexane)spiro-4-methyl-oxazolidine | C | 2-methylcyclohexanone |
| 10 | 3-(α-chloroacetyl)-2-(3', 5', 5',-trimethyl-2'cyclohexene)spiro-4,4-dimethyl-oxazolidine | A | 3,5,5-trimethyl-2-cyclohexenone |
| 11 | 3-(α-chloracetyl)-2-(3', 4'-dimethylcyclohexane)spiro-4,4-dimethyl-oxazolidine | A | 3,4-dimethylcyclohexanone |
| 12 | 3-(α-chloracetyl)-2-(1'-carbethoxypiperidine 4'spiro)-4,4-dimethyl-oxazolidine | A | N-(carbethoxy)-4-azacyclohexanone |
| 13 | 3-(α-chloracetyl)-2-cycloheptanespiro-5-methyl-oxazolidine | B | cycloheptanone |
| 14 | 3-(α-chloracetyl)-2-(2'-methylcyclopentane)spiro-5-methyl-oxazolidine | B | 2-methylcyclopentanone |
| 15 | 3-(α-chloracetyl)-2-(3', 3', 5', 5'-tetramethylcyclohexane)spiro-4,4-dimethyl-oxazolidine | A | 3,3,5,5-tetramethylcyclohexanone |
| 16 | 3-(α-chloracetyl)-2-(3',3',5',5'-tetramethylcyclohexane)spiro-5-methyl-oxazolidine | B | 3,3,5,5-tetramethylcyclohexanone |
| 17 | 3-(α-chloracetyl)-2-(3',5'-dimethylcyclohexane)spiro-4,4-dimethyl-oxazolidine | A | 3,5-dimethylcyclohexanone |
| 18 | 3-(α-chloracetyl)-2-(4'-methylcyclohexane)spiro-4,4-dimethyl-oxazolidine | A | 4-methylcyclohexanone |

A = 2-amino-2-methyl-1-propanol
B = 1-amino-2-propanol
C = 2-amino-1-propanol
D = 2-amino-1-butanol

EXAMPLE 19

3-acetyl-2-cyclohexanespiro-4,4-dimethyl-oxazolidine was prepared using the same procedure as described in Example 2 except that acetyl chloride was used in place of the chloroacetyl chloride. The product, purified by vacuum distillation, exhibited a boiling point of 105°C. at 0.3 mm Hg absolute and was used as a control in the herbicidal evaluations.

EXAMPLE 20

Each experimental candidate pesticide was formulated to assure substantially uniform broadcast of 8.0 pounds active ingredient (candidate) per acre. The resulting compositions were then evaluated as pre-emergence, post-emergence and as soil-incorporated herbicides.

In the pre-emergence herbicidal testing, typical crop plant and weed species were seeded in individual flats, watered in amounts adequate to moisten soil and held for 24 hours before treatment. Candidate chemicals were then applied to the soil surface of flats, taking care to assure that no seedlings had emerged from the soil before chemical treatment.

In post-emergence herbicidal testing, appropriate crop plant and weed species were seeded in individual disposible flats, watered as required and maintained under greenhouse conditions. When all crop plants and weeds had reached suitable growth development, generally first true leaf stage of the slowest plants, containers of plants appropriate to pertaining test requirements were selected for uniformity of growth and development. A 4-inch container of each plant and weed, averaging six (corn) to 50 (crabgrass) or more plants or weeds per individual container was then placed on carrying tray for treatment. Ordinarily, six crop and six weed containers were used in each evaluation.

Soil-incorporation is primarily an attempt to reduce loss of chemical by volatility and solar degradation. In this screening program, soil-incorporation was accomplished by application of the chemical to exposed seeds before covering with fresh untreated soil.

Candidate oxazolidines were dissolved in acetone and diluted with water.

One carrying tray each of pre-emergence (6 crops and 6 weeds) and post-emergence (6 crops and 6 weeds) containers, mounted on a conveyor belt of 1.5 m.p.h. linear speed, tripped a microswitch which in turn activated a solenoid valve and released treatment. Candidate compounds were discharged with pressure as sprays. The treated trays were removed to the greenhouse and held for observation.

Reference standard sterile flats and untreated containers received similar care and handling.

Pre-emergence, and post-emergence, and soil-incorporated treatments were observed daily for interim response with final observations being made 14 days after treatment. Any treatments inducing questionable response were held beyond the 14-day observation period until such response was confirmed.

Observations included all abnormal physiological responses of stem bonding, petiole curvature, epinasty, hyponasty, retardation, stimulation, root development, necrosis, chlorosis and related growth regulant characteristics.

Evaluation of the herbicidal performance of the experimental compounds was made by comparison of plant stands in the treatment with those found in untreated controls.

Where complete kill (100% control) of a plant species was not obtained, herbicidal performance is indicated by two methods. The first is a numerical rating 0 to 100 and represents percent of the plants actually killed at the time of observation. A second indication of herbicidal performance was a vigor rating (a to d) indicated in the Tables as exponents which indicates the general health and appearance of the plants after the chemical treatment. The vigor ratings are as follows:

a. Severe injury - Plants will eventually die
b. Moderate injury - Plants may or may not recover
c. Moderate injury - Plants will recover
d. Slight injury - Plants only slightly behind control
No Exponent - no injury - Plants similar to untreated control Thus, a chemical having a rating of $0^a$ on a barynard grass is nearly as effective as another chemical providing 100% kill of this weed. In the Table, where there was no plant injury, the rating 0 with no exponent is recorded. Where the percent kill was 50 percent or below, the appropriate exponent indicating plant injury was used. Where the percent kill exceeded 50 percent, no such exponent rating is shown.

Oxazolidines having 2-cycloaliphaticspiro substitution and prepared as shown in Examples 1, 2, 3, 4, and 5 were tested as pre-emergence, post-emergence, and soil-incorporated herbicides. The control used in this testing was an analog of the compounds of this invention, but differed in that the N-substituted acyl radical was not halogen-substituted. Preparation of this control, 3-acetyl 2-cyclohexanespiro-4,4-dimethyl-oxazolidine, is described in Example 19.

The results shown in Table I indicate the importance of the halogen substitution in the above-mentioned acyl radical attached to the oxazolidine ring nitrogen. All compounds with haloacyl substitution exhibited herbicidal activity, but the control without such halogen-substitution was without effect toward all plant and weed species tested. Compounds containing cycloaliphatic spiro nuclei of 5,6, and 7 carbon atoms are all effective herbicides showing activity against crabgrass, barnyard grass, pigweed, coffeeweed and millet.

Oxazolidine compounds containing the spiro cyclohexane unit are effective whether the ring is alkylated or unalkylated at the 4 and 5 positions. It is seen that, where such α-chloroacetyl derivatives are unsubstituted at the 4 and 5 ring positions, the compound exhibits herbicidal activity highly selective against crabgrass. Surprisingly, alkylation at these positions increases the herbicidal activity, and especially pronounced activity is shown in the 4,4-dimethyl oxazolidines as demonstrated by the compound of Example ,3-(α-chloracetyl)-2-cyclohexanespiro-4,4-dimethyl-oxazolidine.

The Compound of Example 2, surprisingly, is an excellent pre-emergence herbicidel applied at a rate of 8.0 lb/acre killing all of the crabgrass, barnyard grass, coffeeweed and millet without injury to the crops, corn, soybean, and cotton. When it was employed as a post-emergence or soil-incorporated herbicide, similar selectivity is demonstrated.

It is further seen that herbicidal activity remains in such chloroacylated derivatives even when the size of the cycloaliphatic spiro ring is varied. For instance, the spirocyclopentane compound (Example 4) selectively protects corn when used at 8.0 lb/acre as a post-emergence herbicide. In a similar fashion as shown in Table I, the spirocycloheptane compound (Example 5) selectively kills crabgrass and barnyard grass without injury to the corn and cotton plants.

3-N-methylcarbamyl)-2-cyclohexanespiro-oxazolidine 3-(O,O-diethylthiophosphoryl)-2-cyclohexanespiro-oxazolidine 2,5-dimethyl-3-(3',4'-dichlorobenzoyl)-2-propyl-oxazolidine 3-(α-chloroacetyl)-5-dimethylaminoethyl-2-cyclohexanespiro-oxazolidine (structural uncertain because of possible quaternization)

3-(N-(p-chlorophenyl) carbamoyl)-4,4-dimethyl-2-(3',4'-dimethylcyclohexanespiro)-oxazolidine

TABLE I

Typical Herbicidal Activity of 2-Cycloaliphaticspiro Oxazolidines

| Compound of | Application Type | lbs/acre | Millet | Soybean | Coffee Weed | Rice | Pigweed | Corn | Crab-grass | Cotton | Barnyard Grass |
|---|---|---|---|---|---|---|---|---|---|---|---|
| Example 1 | Pre | 8 | 0 | 0 | 0 | 0 | 0 | 0 | 100 | 0 | 0 |
| | S.I. | 8 | 0 | 0 | 0 | 0 | 0 | 0 | 0 | 0 | 0 |
| | Post | 8 | 0 | 0 | 0 | 0 | 0 | 0 | 0 | 0 | 0 |
| Example 3 | Pre | 8 | 90 | 0 | $0^d$ | $0^d$ | $0^d$ | 0 | $30^a$ | 0 | $70^b$ |
| | S.I. | 8 | $0^b$ | 0 | 0 | $0^d$ | 0 | 0 | $0^c$ | 0 | $0^b$ |
| | Post | 8 | 0 | 0 | $0^d$ | $0^d$ | 100 | $0^d$ | $20^c$ | $0^d$ | $0^d$ |
| Example 4 | Pre | 8 | $0^d$ | 0 | $25^b$ | 0 | 0 | 0 | $10^b$ | 0 | $0^d$ |
| | S.I. | 8 | 0 | 0 | 0 | 0 | 0 | 0 | 0 | 0 | 0 |
| | Post | 8 | 0 | $0^c$ | 100 | $0^d$ | 100 | 0 | $45^b$ | $0^b$ | $0^c$ |
| Example 2 | Pre | 8 | 100 | 0 | 95 | 100 | $0^b$ | 0 | 100 | 0 | 100 |
| | S.I. | 8 | 85 | $0^d$ | 80 | 100 | $0^c$ | 0 | 100 | $0^d$ | 100 |
| | Post | 8 | 85 | $0^d$ | 100 | 60 | 100 | 0 | 100 | $0^c$ | 100 |
| Example 5 | Pre | 8 | 75 | 0 | $15^b$ | 70 | 0 | 0 | 100 | 0 | 100 |
| | S.I. | 8 | $0^d$ | 0 | $0^d$ | 90 | 0 | 0 | $15^c$ | 0 | $10^b$ |
| | Post | 8 | $0^d$ | $0^c$ | 50 | 0 | $0^c$ | $0^d$ | $0^b$ | $0^b$ | $15^b$ |
| Example 19 | Pre | 8 | 0 | 0 | 0 | 0 | 0 | 0 | 0 | 0 | 0 |
| Control | S.I. | 8 | 0 | 0 | 0 | 0 | 0 | 0 | 0 | 0 | 0 |
| | Post | 8 | 0 | 0 | 0 | 0 | 0 | 0 | 0 | 0 | 0 |

Vigor Ratings:
$a$ Severe injury — Plants will eventually die.
$b$ Moderate injury — Plants may or may not recover.
$c$ Moderate injury — Plants will recover.
$d$ Slight injury — Plants only slightly behind control.
No Exponent — No injury — Plants similar to untreated control.

EXAMPLE 21

The compound of Example 2,3-(α-chloroacetyl)-2-cyclohexanespiro-4,4-dimethyl-oxazolidine was evaluated according to the procedure indicated in Example 20 at a broadcast rates of 4.0 and 2.0 pounds per acre. The results in Table II indicate the remarkable selectivity of this oxazolidine in protecting soybean, corn, and cotton crops. Crabgrass and barnyard grass were almost completely controlled when the compound of Example 2 was applied as pre-emergence, post-emergence, and soil-incorporated herbicides at 4.0 pounds per acre. Surprising activity was observed even at application rates of 2.0 lbs. per acre as a pre-emergence and soil-incorporated herbicide.

In herbicide testing like that of Example 20, the following oxazolidine compounds showed no activity:

3-(N-p-chlorophenylcarbamyl)-2-cyclohexanespiro-oxazolidine 3-(N-methylcarbamyl)-2-cyclohexanespiro-oxazolidine 3-(N-3,4-dichlorophenylcarbamyl)2-cyclohexanespiro-oxazolidine 3-(methylsulfonyl)-2-cyclohexanespiro-oxazolidine 3-(N-methylthiocarbamyl)-2-cyclohexanespiro-oxazolidine 5-diethylaminomethyl-3-carbophenoxy-2-cyclohexanespiro-oxazolidine 5-diethylaminomethyl-3-(N-m-tolylcarbamoyl)2-cyclohexanespiro-oxazolidine 3-(N-(p-chlorophenyl) carbamoyl)-5-diethylaminoethyl-2-cyclohexanespiro-oxazolidine.

These results specifically point out the importance of the 3-haloacyl group substitution on the oxazolidine ring.

EXAMPLE 22

The compounds of Examples 17 and 18, when tested as a pre-emergence herbicide at application rates of 4.0 lb/acre selectively controlled weeds including crabgrass and barnyard grass.

EXAMPLE 23

A mixture of 3 parts of the compound of Example 2 and 1 part Atrazine was formulated as a 50 percent wettable powder on Continental clay using 2.5 percent of conventional wetting agent. This mixture tested as a pre-emergence herbicide was remarkably superior to equivalent amounts of either component used alone in a similar formulation. A synergistic effect with enhanced weed control and unexpected crop tolerance, especially toward cotton, was noted.

TABLE II

Herbicidal Activity of 3-(α-chloroacetyl)-2-cyclohexanespiro-4,4-dimethyl-oxazolidine

| Application Type | Lbs/acre | Millet | Soybean | Coffee Weed | Rice | Pigweed | Corn | Crabgrass | Cotton | Barnyard Grass |
|---|---|---|---|---|---|---|---|---|---|---|
| Pre  | 4 | 15$^b$ | 0 | 20$^b$ | 0$^c$ | 0$^b$ | 0 | 100 | 0 | 100 |
| Post | 4 | 0$^b$ | 0 | 0$^d$ | 0 | 0$^c$ | 0 | 0$^b$ | 0 | 0$^b$ |
| S.I. | 4 | 0$^c$ | 0 | 0$^d$ | 80$^b$ | 0 | 0 | 95$^a$ | 0 | 95$^a$ |
| Pre  | 2 | 0$^b$ | 0 | 0$^b$ | 0$^d$ | 0 | 0 | 70$^b$ | 0 | 75$^a$ |
| Post | 2 | 0$^d$ | 0 | 0 | 0 | 0 | 0 | 0$^c$ | 0 | 0$^c$ |
| S.I. | 2 | 0$^d$ | 0 | 0 | 15$^c$ | 0 | 0 | 95$^a$ | 0 | 0$^c$ |

Vigor Rating:
$^a$— Severe injury — plants will eventually die
$^b$— Moderate injury — plants may or may not recover
$^c$— Moderate injury — plants will recover
$^d$— Slight injury — plants only slightly behind control
No Exponent — No injury — plants similar to untreated control

What is claimed is:

1. A process for controlling undesirable growth of vegetation which comprises applying to the locus thereof a herbicidally effective amount of an N-haloacyl (2-spirocycloaliphatic) oxazolidine wherein the haloacyl is $C_{2-4}$ acyl, the 4 and 5 carbon atom valences are satisfied by hydrogen atoms or $C_{1-6}$ alkyl groups, and said spirocycloaliphatic group is cyclopentyl, cyclohexyl, cyclohexenyl or cycloheptyl.

2. The process of claim 1 wherein the oxazolidine is 3-(α-chloroacetyl)-2-cyclohexanespiro-4,4-dimethyloxazolidine.

3. The process of claim 1 wherein the oxazolidine is 3-(α-chloroacetyl)-2-cycloheptanespiro-4,4-dimethyloxazolidine.

4. The process of claim 1 wherein the oxazolidine is 3-(α-chloroacetyl-2-cyclopentanespiro-4,4-dimethyloxazolidine.

5. The process of claim 1 wherein the oxazolidine is 3-(α-chloroacetyl)-2-cyclohexanespiro-5-methyloxazolidine.

6. The process of claim 1 wherein the oxazolidine is 3-(α-chloroacetyl)-2-(2'-methylcyclopentane)spiro-5-methyl-oxazolidine.

7. The process of claim 1 wherein the oxazolidine is 3-(α-chloroacetyl)-2-(3',5',5'-trimethyl-2'-cyclohexene)spiro-4,4-dimethyl-oxazolidine.

8. The process of claim 1 wherein the oxazolidine is 3-(α-chloroacetyl)-2-(4'-methylcyclohexane)spiro-4,4-dimethyl-oxazolidine.

9. The process of claim 1 wherein the oxazolidine is 3-(α-chloroacetyl)-2-(3'-5'-dimethylcyclohexane)spiro-4,4-dimethyl-oxazolidine.

10. The process of claim 1 wherein the oxazolidine is 3-(α-chloroacetyl)-2-(3',4'-dimethylcyclohexane)spiro-4,4-dimethyl-oxazolidine.

11. The process of claim 1 wherein the oxazolidine is 3-(α-chloroacetyl)-2-cycloheptanespiro-5-methyl-oxazolidine.

12. A process for controlling undesirable growth of vegetation which comprises applying to the locus thereof a herbicidally effective amount of 3(α-chloroacetyl)-2-(1'-carbethoxypiperidine-4'-spiro)-4,4-dimethyl-oxazolidine.

* * * * *